United States Patent
Maes

(10) Patent No.: US 9,985,686 B2
(45) Date of Patent: May 29, 2018

(54) NON-LINEAR PRECODING WITH A MIX OF NLP CAPABLE AND NLP NON-CAPABLE LINES

(71) Applicant: Alcatel Lucent, Boulogne-Billancourt (FR)

(72) Inventor: Jochen Maes, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/528,647

(22) PCT Filed: Dec. 8, 2015

(86) PCT No.: PCT/EP2015/078925
§ 371 (c)(1),
(2) Date: May 22, 2017

(87) PCT Pub. No.: WO2016/091852
PCT Pub. Date: Jun. 16, 2016

(65) Prior Publication Data
US 2017/0279490 A1    Sep. 28, 2017

(30) Foreign Application Priority Data

Dec. 11, 2014 (EP) .................................. 14306998

(51) Int. Cl.
*H04K 1/10* (2006.01)
*H04L 27/28* (2006.01)
(Continued)

(52) U.S. Cl.
CPC ........... *H04B 3/32* (2013.01); *H04L 25/0391* (2013.01); *H04L 25/03821* (2013.01); *H04L 2025/03426* (2013.01)

(58) Field of Classification Search
CPC ...... H04B 3/32; H04B 7/0689; H04B 7/0417; H04B 7/0665; H04L 25/03821; H04L 25/0391; H04L 2025/03426
(Continued)

(56) References Cited

U.S. PATENT DOCUMENTS

| 5,878,086 | A | * | 3/1999 | Hulyalkar | .......... | H03H 17/0266 |
| | | | | | | 348/21 |
| 8,116,702 | B2 | * | 2/2012 | Tosato | ..................... | H04B 7/04 |
| | | | | | | 375/296 |

(Continued)

FOREIGN PATENT DOCUMENTS

| EP | 2800283 A1 | 11/2014 |
| WO | WO-2014054043 A1 | 4/2014 |

OTHER PUBLICATIONS

Muller Francisco C B F et al: "Optimizing power normalization for G.fast linear precoder by linear programming", 2014 IEEE International Conference on Communications (ICC), IEEE, Jun. 10, 2014 (Jun. 10, 2014), pp. 4160-4165, XP032632083, DOI: 10.1109/ICC.2014.6883973.
(Continued)

*Primary Examiner* — Phuong Phu
(74) *Attorney, Agent, or Firm* — Harness, Dickey & Pierce, P.L.C.

(57) ABSTRACT

The method includes organizing a plurality of subscriber lines into a first group of subscriber lines and a second group of subscriber lines, the first group of subscriber lines at least including all the subscriber lines of the plurality of subscriber lines that do not support non-linear precoding operation and the second group of subscriber lines including the remaining subscriber lines of the plurality of subscriber lines; scaling first signals to be transmitted over respective ones of the first group of subscriber lines to confine respective intermediate transmit power levels at the input of a
(Continued)

modulo unit and further to bypass or make ineffective the operation of the modulo unit; and processing the so scaled first signals and second signals to be transmitted over respective ones of the second group of subscriber lines through the first and second precoding stages.

15 Claims, 6 Drawing Sheets

(51) Int. Cl.
    *H04B 3/32*     (2006.01)
    *H04L 25/03*     (2006.01)

(58) Field of Classification Search
    USPC ............... 375/260, 257, 219, 220, 229, 232
    See application file for complete search history.

(56) References Cited

U.S. PATENT DOCUMENTS

| | | | | |
|---|---|---|---|---|
| 2007/0081582 | A1* | 4/2007 | Ginis | H04B 3/32 375/222 |
| 2009/0175375 | A1* | 7/2009 | Zhang | H04L 25/03343 375/267 |
| 2013/0064150 | A1* | 3/2013 | Hirata | H04B 7/0665 370/310 |
| 2014/0146904 | A1* | 5/2014 | Onodera | H04B 7/0417 375/267 |
| 2014/0204841 | A1* | 7/2014 | Ruiz Delgado | H04B 7/0689 370/328 |
| 2015/0244418 | A1 | 8/2015 | Verbin et al. | |
| 2016/0043786 | A1* | 2/2016 | Maes | H04B 3/32 375/260 |
| 2017/0054473 | A1* | 2/2017 | Jochen | H04B 3/32 |

OTHER PUBLICATIONS

Ikanos Communications: "G.fast: Comparison of Linear and Non-Linear Pre-coding for G.fast on 100 m BT Cable;TD2013-01-Q4-031", ITU-T Draft ; Study Period 2013-2016, International Telecommunication Union, Geneva ; CH, vol. 4/15, Jan. 23, 2013 (Jan. 23, 2013), pp. 1-10, XP017580319.

International Search Report PCT/ISA/210 for International Application No. PCT/EP2015/078925 dated Feb. 9, 2016.

* cited by examiner ated at a Central Office
NON-LINEAR PRECODING WITH A MIX OF NLP CAPABLE AND NLP NON-CAPABLE LINES

CROSS-REFERENCE TO RELATED APPLICATIONS

This application is a national phase under 35 U.S.C. § 371 of PCT International Application No. PCT/EP2015/078925 which has an International filing date of Dec. 8, 2015, which claims priority to European Application No. 14306998.7, filed Dec. 11, 2014, the entire contents of each of which are hereby incorporated by reference.

TECHNICAL FIELD OF THE INVENTION

The present invention relates to crosstalk mitigation within a wired communication system.

TECHNICAL BACKGROUND OF THE INVENTION

Crosstalk (or inter-channel interference) is a major source of channel impairment for Multiple Input Multiple Output (MIMO) wired communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

Different strategies have been developed to mitigate crosstalk and to maximize effective throughput, reach and line stability. These techniques are gradually evolving from static or dynamic spectral management techniques to multi-user signal coordination (vectoring hereinafter).

One technique for reducing inter-channel interference is joint signal precoding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal post-processing: the receive data symbols are jointly passed through a postcoder before being detected. The postcoder is such that the concatenation of the communication channels and the postcoder results in little or no inter-channel interference at the receivers. Postcoders are also sometimes referred to as crosstalk cancellation filters.

Signal vectoring is typically performed at a traffic aggregation point as vectoring primarily implies that data symbols concurrently transmitted over, or received from, the vectored lines are bunched and passed all together through the precoder or postcoder. For instance, signal vectoring is advantageously performed within a Digital Subscriber Line Access Multiplexer (DSLAM) deployed at a Central Office (co), or as a fiber-fed remote unit closer to subscriber premises (street cabinet, pole cabinet, building cabinet, etc). Such a remote unit may also be referred to as a remote DSLAM, an Optical Network Unit (ONU), or a Distribution Point Unit (DPU). Signal precoding is particularly appropriate for downstream communication (toward customer premises), while signal post-processing is particularly appropriate for upstream communication (from customer premises).

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line incurring crosstalk from the other communication lines of the group. Crosstalk from lines that do not belong to the vectoring group is treated as alien noise and is not canceled.

Ideally, the vectoring group should match the whole set of communication lines that physically and noticeably interfere with each other. Yet, local loop unbundling on account of national regulation policies and/or limited vectoring capabilities may prevent such an exhaustive approach, in which case the vectoring group would include a sub-set only of all the interfering lines, thereby yielding limited vectoring gains.

More formally, a vectored system can be described by the following linear model:

$$Y(k)=H(k)X(k)+Z(k) \quad (1),$$

wherein the N-component complex vector X, respectively Y, denotes a discrete frequency representation, as a function of the frequency/carrier/tone index k, of the symbols transmitted over, respectively received from, the N vectored channels, wherein the N×N complex matrix H is referred to as the channel matrix: the (i,j)-th component $h_{ij}$ of the channel matrix H describes how the communication system produces a signal on the i-th channel output in response to a signal being transmitted to the j-th channel input; the diagonal elements of the channel matrix describe direct channel coupling, and the off-diagonal elements of the channel matrix (also referred to as the crosstalk coefficients) describe inter-channel coupling, and wherein the N-component complex vector Z denotes additive noise over the N channels, such as Radio Frequency Interference (RFI) or thermal noise.

Linear signal precoding and post-processing are advantageously implemented by means of matrix products.

In downstream, the linear precoder performs a matrix-product in the frequency domain of a transmit vector U(k) with a precoding matrix P(k), i.e. X(k)=P(k)U(k) in eq. (1), the precoding matrix P(k) being such that the overall channel matrix H(k)P(k) is diagonalized, meaning the off-diagonal coefficients of the overall channel H(k)P(k), and thus the inter-channel interference, mostly reduce to zero.

Practically, and as a first order approximation, the precoder superimposes anti-phase crosstalk pre-compensation signals over the victim line along with the direct signal that destructively interfere at the receiver with the actual crosstalk signals from the respective disturber lines.

In upstream, the linear postcoder performs a matrix-product in the frequency domain of the receive vector Y(k) with a crosstalk cancellation matrix Q(k) to recover the transmit vector U(k) (after channel equalization and power normalization), the crosstalk cancellation matrix Q(k) being such that the overall channel matrix Q(k)H(k) is diagonalized, meaning the off-diagonal coefficients of the overall channel Q(k)H(k), and thus the inter-channel interference, mostly reduce to zero.

The performance of signal vectoring depends critically on the component values of the precoding or cancellation matrix, which component values are to be computed and updated according to the actual and varying channel couplings.

The various channel couplings are estimated by a vectoring controller based on pilot (or probing) signals transmitted over the respective channels. The pilot signals are typically transmitted over dedicated symbols and/or over dedicated tones.

For instance, in the recommendation entitled "*self-FEXT Cancellation (Vectoring) For Use with VDSL2 Transceivers*", ref. G.993.5 (VDSL2 hereinafter), and adopted by the International Telecommunication Union (ITU) in April 2010, the transceiver units send pilot signals on the so-called SYNC symbols. The SYNC symbols occur periodically after every super frame, and are transmitted synchronously over all the vectored lines (super frame alignment). A similar technique has been adopted in G.9701 ITU recommendation (G.fast hereinafter).

On a given disturber line, a subset of the carriers of a SYNC symbol (pilot tones hereinafter) are all 4-QAM modulated by the same pilot digit from a given pilot sequence, and transmit one of two complex constellation points, either '1+j' corresponding to '+1' or '−1−j' corresponding to '−1' (VDSL2); or transmit one of three complex constellation points, either '1+j' corresponding to '+1' or '−1−j' corresponding to '−1' or '0+0j' corresponding to '0' (G.fast).

On a given victim line, both the real and imaginary part of the received frequency sample before equalization (G.fast), or of the normalized slicer error, which is the difference vector between the received and properly equalized frequency sample and the constellation point onto which this frequency sample is demapped (VDSL2 and G.fast), are measured on a per pilot tone basis and reported for a specific SYNC symbol to the vectoring controller for further crosstalk estimation.

The successive error samples gathered over a given victim line are next correlated with the pilot sequence used over a given disturber line in order to obtain an estimate of the channel coupling from the given disturber line into the given victim line. To reject the crosstalk contributions from the other disturber lines, the pilot sequences used over the respective disturber lines are mutually orthogonal (e.g., Walsh-Hadamard sequences).

The crosstalk estimates are eventually used for initializing the coefficients of the precoding or cancellation matrix, typically by means of a first or higher-order matrix inversion of the channel matrix for a Zero-Forcing (ZF) linear precoder. Once the precoding or cancellation matrix is initialized and in force, the process is repeated as needed to track the residual crosstalk and to obtain more and more accurate estimates. Those estimates are then used to update the coefficients of the precoding or cancellation matrix, typically by means of additive or multiplicative matrix updates.

With the advent of new copper access technologies and the use of even broader spectrum up to and beyond 100 MHz, the crosstalk coupling substantially increases. The power of the crosstalk signals may even surpass the power of the direct signals. Consequently, the superimposition of the crosstalk precompensation signals on a victim line may cause a violation of the transmit Power Spectral Density (PSD) mask, which defines the allowed amount of signal power for an individual user as a function of frequency, and may as well result in signal clipping within the Digital to Analog Converter (DAC) causing severe signal distortions.

A prior art solution is to scale down the gains of the direct signals, and thus of the corresponding precompensation signals, such that the transmit signals, including both the direct and precompensation signals, remain within the allowed bounds. The PSD reduction is line and frequency dependent, and may change over time, e.g. when a line joins or leaves the vectoring group. The change in direct signal gains must be communicated to the respective receivers for proper channel equalization. This first solution has been described in a standard contribution to the International Telecommunication Union (ITU) from Alcatel-Lucent entitled "*G.fast: Precoder Gain Scaling*", reference ITU-T SG15 Q4a 2013-03-Q4-053, March 2013.

Another prior art solution is the use of Non-Linear Precoding (NLP), which applies modulo arithmetic operation to shift a transmit constellation point with excessive power back within the constellation boundary. At the receiver, the same modulo operation will shift the signal back to its original position.

The idea to employ modulo arithmetic to bound the value of the transmit signal was first introduced by Tomlinson and Harashima independently and nearly simultaneously with application to single-user equalization (M. Tomlinson, "*New Automatic Equalizer Employing Modulo Arithmetic*" Electronics Letters, 7(5-6), pp. 138-139, March 1971; and H. Harashima, and H. Miyakawa, "*Matched-Transmission Technique for Channels with Inter Symbol Interference*" IEEE Trans. on Communications, 20(4), pp. 774-780, August 1972). Ginis and Cioffi applied the concept to multi-user system for crosstalk cancellation (G. Ginis and J. M. Cioffi, "*A Multi-User Precoding Scheme Achieving Crosstalk Cancellation with Application to DSL Systems*", Proc. 34th Asilomar Conference on Signals, Systems and Computers, 2000).

Yet, modulo operation directly affects the transmit signal and thus the actual crosstalk induced onto the system, ending into a 'chicken-egg' problem: modulo operation for a first user alters precompensation for a second user; altered precompensation for the second user alters modulo operation for the second user; altered modulo operation for the second user user alters precompensation for the first user; and altered precompensation for the first user alters modulo operation for the first user; and so forth.

In order to overcome this issue, the non-linear precoder is constructed using the so-called QR matrix decomposition. A good overview of the technique, with step-by-step description of the functions is given by Ikanos (S. Singh, M. Sorbara, "G.fast: Comparison of Linear and Non-Linear Precoding for G.fast on 100 m BT Cable", ITU-T SG15 Q4a contribution 2013-01-Q4-031, January 2013).

More formally, the channel matrix H is first written as:

$$H=DG \quad (2),$$

wherein the carrier index k has been voluntarily omitted, D is a diagonal matrix comprising the direct channel coefficients $h_{i,i}$, and G is the normalized channel matrix with unit diagonal.

Ideal ZF linear precoding is achieved when the precoding matrix P implements the inverse of the normalized channel matrix, namely:

$$P=G^{-1} \quad (3),$$

such that H·P=D, the latter being compensated by single-tap Frequency EQualization (FEQ) at the receivers.

With linear ZF precoding, the noise at the receiver input is enhanced by the direct channel frequency response by a factor $1/h_{i,i}$. We also note that the noise is evenly enhanced for identical lines as they are all expected to have an almost equal path loss $h_{i,i}$.

With non-linear precoding, the conjugate transpose of the normalized channel matrix is first factored into two matrices, namely:

$$G^* = QR \tag{4}$$

wherein * denotes the conjugate transpose, R is an N×N upper triangular matrix, and Q is a N×N unitary matrix (i.e., Q*Q=I).

One diagonalizing precoding matrix is then given by:

$$P = QR^{*-1} \tag{5}$$

yielding $HP = DGQR^{*-1} = DR^*Q^*QR^{*-1} = D$.

Let us write:

$$L = R^{*-1}S \tag{6}$$

wherein L is a N×N lower triangular matrix with unit diagonal, and S is a N×N normalization diagonal matrix whose elements are the diagonal elements of R*.

The diagonal matrix S indicates a per-line precoding gain that depends on the encoding order. S scaling is to be disposed of as it would adversely affect the power of the direct signals and the achievable bit rates, thereby yielding P=QL and HP=DGQL=DR*Q*QR*$^{-1}$S=DS. A further equalization step S$^{-1}$ is thus required at the receivers to recover the initial transmit samples. The gain scaling matrix S is determined by the vectoring controller, and sent to the receivers for proper signal equalization.

Ideal ZF non-linear precoding is thus achieved with a first feedforward filter L, or equivalently with a first feedback filter $M=I-L^{-1}=I-S^{-1}R^*$, followed by a second feedforward filter Q. The feedback structure allows the feeding of the output samples after modulo operation back to the filter's input, while the triangular structure of the matrix M in the feedback loop is a solution to the aforementioned 'chicken-egg' problem: the modulo output for user i serves as input for users j encoded later (j>i), but does not affect the output of users k encoded earlier (k<i).

Hence, in a first step, each element i of the transmit vector U is added row by row to the i$^{th}$ output of the feedback filter M, which is a function of the previous i−1 outputs only, but before proceeding to the next row, the output for element i is adapted through a modulo operation, thereby keeping the transmit power within the allowed bounds. In a second step, the resulting vector is multiplied with the matrix Q, which preserves the initial transmit power on account of its unitary property.

More formally, the output of the non-linear precoder X' is given by:

$$x'_1 = \Gamma_{1,k}(u_1) = u_1 \tag{7}$$

$$x'_2 = \Gamma_{2,k}(u_2 + m_{21}x'_1) = \Gamma_{2,k}\left(u_2 - \frac{r_{21}}{r_{22}}x'_1\right)$$

$$\vdots$$

$$x'_N \Gamma_{N,k}(u_N + m_{NN-1}x'_{N-1} + \ldots + m_{N1}x'_1) =$$

$$\Gamma_{N,k}\left(u_N - \frac{r_{NN-1}}{r_{NN}}x'_{N-1} - \cdots - \frac{r_{N1}}{r_{NN}}x'_1\right),$$

wherein $u_i$, $x_i'$, $m_{ij}$ and $r_{ij}$ denote the coefficients of U, X', M and R* respectively, and wherein $\Gamma_{i,k}$ denotes the modulo operator as a function of the constellation size for carrier k and user i.

The modulo operator $\Gamma_{i,k}$ is given by:

$$\Gamma_{i,k}(x_{i,k}) = x_{i,k} - d \cdot M_{i-k} \cdot \left\lfloor \frac{x_{i,k} + d \cdot M_{i,k}/2}{d \cdot M_{i,k}} \right\rfloor, \tag{8}$$

wherein $x_{i,k}$ denotes a transmit frequency sample for carrier k and user i, $M_{i,k}$ denotes the number of constellation points per I/Q dimension for carrier k and user i, and d denotes the distance between neighboring constellation points in the one dimension.

At the receiver, the equalized receive signal samples are given by:

$$y'_i = r_{ii}\Gamma_{i,k}\left(u_i - \sum_{j=1}^{i-1}\frac{r_{ij}}{r_{ii}}x'_j\right) + \sum_{j=1}^{i-1} r_{ij}x'_j + z_i. \tag{9}$$

A further equalization step S$^{-1}$ together with a further modulo operation is then needed to recover the initial transmit vector U:

$$\hat{y}_i = \Gamma_{i,k}\left(\frac{y'_i}{r_{ii}}\right) = \tag{10}$$

$$\Gamma_{i,k}\left(\Gamma_{i,k}\left(u_i - \sum_{j=1}^{i-1}\frac{r_{ij}}{r_{ii}}x'_j\right) + \sum_{j=1}^{i-1}\frac{r_{ij}}{r_{ii}}x'_j + \frac{z_i}{r_{ii}}\right) = \Gamma_{i,k}\left(u_i + \frac{z_i}{r_{ii}}\right).$$

The term $$u_i + \frac{z_i}{r_{ii}}$$

is expected to be within the constellation boundaries and thus $$\Gamma_{i,k}\left(u_i + \frac{z_i}{r_{ii}}\right)$$

should be equal to $$u_i + \frac{z_i}{r_{ii}}.$$

The decision $\hat{u}_i$ is then made on that sample.

We note that the noise sample at the receiver input is enhanced by a factor of $1/r_{ii}$. We also note that for a cable with identical lines, the diagonal values of the R* matrix do not have the same value; hence the noise enhancement is not the same on each line, which may lead to an unfair distribution of bit rates to the different users depending on the level of crosstalk couplings.

An alternative implementation of a non-linear precoder has been described in the European patent application entitled "Non-Linear Precoder with Separate Modulo Decision" filed by Alcatel-Lucent, and published on May 11, 2014 with publication number EP2800283. In this implementation, the modulo operation is done in a separate sequential loop, only calculating the shift-vector Δ caused by the modulo unit without partial precoding of the transmit samples. After adding the shift vector Δ to the transmit vector U, a full precoding step is performed at once with the precoding matrix P=QL. This implementation is particularly advantageous in that different update policies can be adopted for the modulo shift unit and the precoding stage. For instance, one can use a lower-precision arithmetic for the modulo shift unit since the multiplication of L is not in the data path but only serves in generating the shift vector $\Delta$, with the elements of $\Delta$ being on a coarse grid. Still for instance, one may leverage on the techniques developed for linear precoding for tracking the residual crosstalk and for updating the precoding matrix P without tracking Q and L independently.

In G.fast, the first version only supports Linear Precoding (LP) over a 100 MHz communication bandwidth, while mandatory support for NLP over a 200 MHz communication bandwidth will be requested in a second version. Consequently, one might expect that G.fast deployment starts with LP only, and that NLP will be gradually introduced in the field when the second version is ready and NLP capable CPEs are available. This would lead to the co-existence of NLP non-capable and NLP capable CPEs.

As a first solution to this issue, one may substitute NLP capable CPEs for the legacy CPEs, which represents substantial Operation Expenditures (OPEX) and organizational issues (what if a customer is unwilling or unable to replace its CPE, or is in holidays?).

As a second solution, one may use LP only, thereby waiving the NLP performance gains.

As a third and last solution, one may restrict the NLP non-capable CPEs to a reduced bandwidth $f_{cutoff}$ and perform LP below $f_{cutoff}$ and NLP above $f_{cutoff}$. Simulations suggest a typical cut-off frequency would be about 50 MHz. Yet, this leads to poor performance over the NLP non-capable lines.

SUMMARY OF THE INVENTION

It is an object of the present invention to achieve good crosstalk mitigation performance in the presence of NLP non-capable and NLP capable CPEs.

In accordance with a first aspect of the invention, a method is proposed for jointly processing signals to be transmitted over respective ones of a plurality of subscriber lines through a non-linear precoder. The non-linear precoder comprises a first non-linear precoding stage configured to operate according to a first triangular precoding matrix and including a modulo unit, followed by a second linear precoding stage configured to operate according to a second precoding matrix. The method comprises organizing the plurality of subscriber lines into a first group of subscriber lines and a second group of subscriber lines. The first group of subscriber lines at least comprises the subscriber lines of the plurality of subscriber lines that do not support non-linear precoding operation; and the second group of subscriber lines comprises the remaining subscriber lines of the plurality of subscriber lines. The method further comprises scaling first signals to be transmitted over respective ones of the first group of subscriber lines to confine respective intermediate transmit power levels at the input of the modulo unit and further to bypass or make ineffective the operation of the modulo unit, and processing the so scaled first signals and second signals to be transmitted over respective ones of the second group of subscriber lines through the first and second precoding stages.

In accordance with another aspect of the invention, a non-linear precoder for jointly processing signals to be transmitted over respective ones of a plurality of subscriber lines comprises a first non-linear precoding stage configured to operate according to a first triangular precoding matrix and including a modulo unit, followed by a second linear precoding stage configured to operate according to a second precoding matrix. The plurality of subscriber lines is organized into a first group of subscriber lines and a second group of subscriber lines. The first group of subscriber lines at least comprises the subscriber lines of the plurality of subscriber lines that do not support non-linear precoding operation; the second group of subscriber lines comprises the remaining subscriber lines of the plurality of subscriber lines. The non-linear precoder is configured to scale first signals to be transmitted over respective ones of the first group of subscriber lines to confine respective intermediate transmit power levels at the input of the modulo unit and further to bypass or make ineffective the operation of the modulo unit, and to process the so scaled first signals and second signals to be transmitted over respective ones of the second group of subscriber lines through the first and second precoding stages.

Such a non-linear precoder typically forms part of an access node providing broadband communication services over subscriber lines deployed at a co or at a remote location closer to subscriber premises.

In one embodiment of the invention, the first group of subscriber lines is assigned the first precoding positions in the first and second precoding matrices while the second group of subscriber lines is assigned the last precoding positions in the first and second precoding matrices.

In one embodiment of the invention, the intermediate power levels are confined within a transmit power mask applicable to transmission of signals over the plurality of subscriber lines.

In one embodiment of the invention, the first group of subscriber lines further comprises a subscriber line of the plurality of subscriber lines that supports non-linear precoding operation.

In one embodiment of the invention, the addition of the subscriber line to the first group of subscriber lines is restricted to given carriers for which non-linear precoding induces a net penalty compared to linear precoding.

In one embodiment of the invention, information indicative of the identity of the given carriers are sent to a remote transceiver coupled to the subscriber line.

In one embodiment of the invention, the scaling of the first signals is applied upfront before the first precoding stage.

In one embodiment of the invention, the scaling of the first signals and the processing of the first signals through the first precoding stage are performed by means of a single matrix multiplication stage.

In one embodiment of the invention, the scaling of the first signals and the processing of the first signals through the first and second precoding stages are performed by means of a single matrix multiplication stage.

In one embodiment of the invention, the second precoding matrix is a unitary matrix.

In one embodiment of the invention, the second precoding matrix is a full precoding matrix, such as a Zero-Forcing (ZF) precoding matrix that aims at inverting the normalized channel matrix G.

Embodiments of a non-linear precoder according to the invention correspond with the aforementioned embodiments of a method according to the invention.

A precoding scheme and a precoder are proposed that ensure the co-existence of NLP non-capable and NLP capable CPEs and provide a performance strictly higher than pure LP for all CPEs, even for the legacy CPEs.

The subscriber lines are organized into two groups: the first group includes all NLP non-capable lines at least, and the second group includes the remaining NLP capable lines.

The first group of lines is precoded first, and the second group of lines is precoded last. First and last herein refer to the precoding position of a subscriber line in the non-linear precoder, and indirectly refer to the row and column index in the precoding matrices to which that subscriber line corresponds. Say it differently, the first group of lines corresponds to the lowest indices of the precoding matrices, while the second group of lines corresponds to the highest ones.

The signal samples to be transmitted over the first group of lines are input to the first nonlinear precoding stage. These signal samples are properly scaled so as the intermediate transmit power levels at the input of the modulo unit during their processing through the first nonlinear precoding stage remain within bounds. On account of this power confinement, the modulo operation can be by-passed or is ineffective, and the precoded samples can be correctly recovered by the legacy CPEs without any further modulo operation.

As these legacy lines are encoded first, the scaling gains and thus the achievable data rates are much higher than the typical gain adjustments required for pure LP operation owing to the triangular structure of the first precoding matrix, since only the first group of lines has to be dealt with for power confinement, and owing to the unitary property of the second precoding matrix, which preserves norm and thus power.

Still also, the first group of lines does not need to be encoded in sequence one after the other as it is typically required with NLP, but rather can be encoded "en bloc" using parallel processing pipes.

The proposed scheme can be used even when all CPEs are NLP capable. Indeed, a line may benefit from NLP on some carriers, whereas the same line may incur a net penalty on other carriers due to the increased modulation gap or the NLP power penalty. Such a line is then moved to the first group of lines for those specific carriers, implying that the group definition (and thus the precoding position) may be frequency-dependent.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
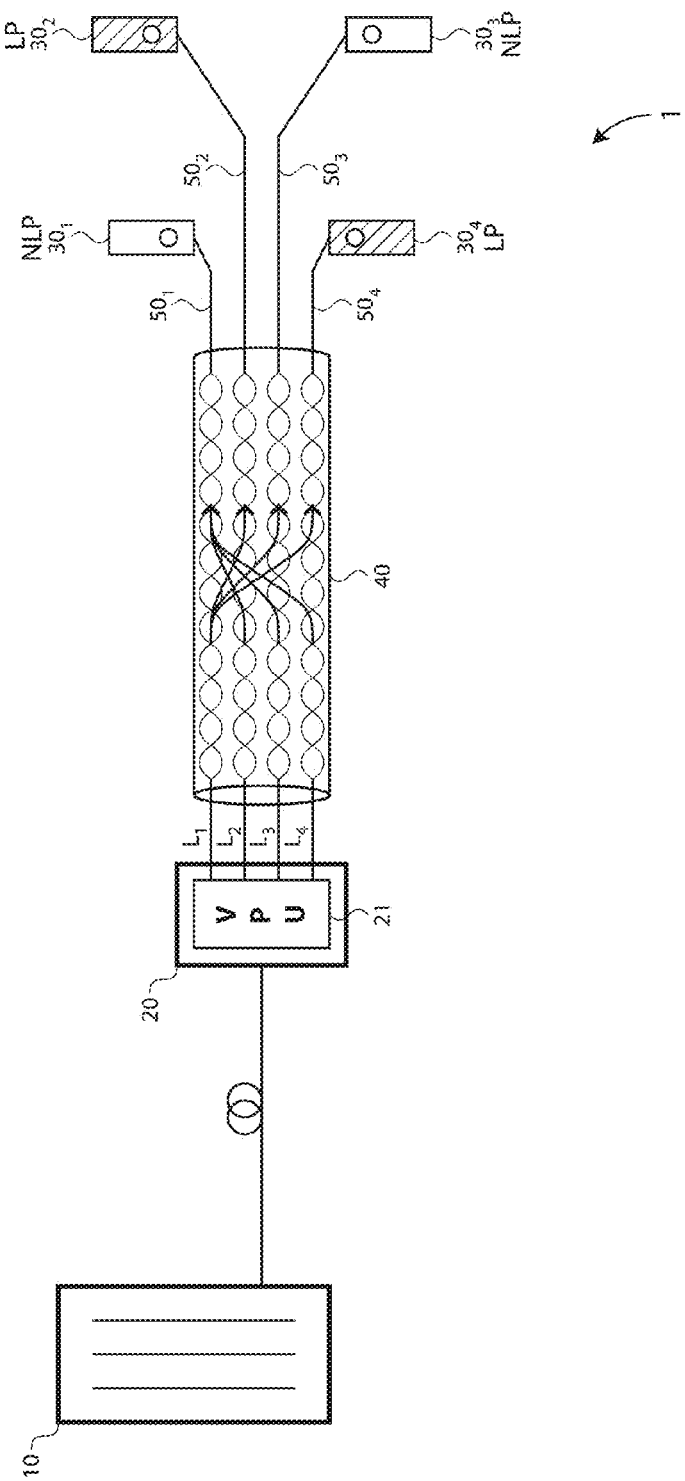
FIG. 1 represents an overview of an access plant.

There is seen in FIG. 1 an access plant 1 comprising a network unit 10 at a CO, an access node 20 coupled via one or more optical fibers to the network unit 10, and further coupled via a copper loop plant to Customer Premises Equipment (CPE) 30 at various locations. The transmission media is typically composed of copper Unshielded Twisted Pairs (UTP).

As an illustrative example, the loop plant comprises four subscriber lines $L_1$ to $L_4$ sharing a common access segment 40, and then going through dedicated loop segments 50 for final connection to CPEs $30_1$ to $30_4$ respectively.

Within the common access segment 40, the subscriber lines $L_1$ to $L_4$ are in close vicinity with each other and thus induce crosstalk into each other (see the arrows in FIG. 1 between the respective subscriber lines).

The access node 20 comprises a Vectoring Processing Unit 21 (or VPU) for jointly processing the data symbols that are being transmitted over, or received from, the loop plant in order to mitigate the crosstalk and to increase the communication data rates achievable over the respective subscriber lines.

The description will now focus on downstream communications, and further on the precoding of the downstream communication signals.

The VPU 21 implements NLP in order to enhance the vectoring gains in the presence of strong crosstalk. Yet, the CPEs 30 are not necessarily all NLP capable as this requires the use of a modulo unit within the CPE to recover the original transmit samples, as well as some further scaling logic. So there is assumed a mix of NLP capable and NLP non-capable CPEs. Presently, the CPEs $30_1$ and $30_3$ are NLP capable CPEs and support both linear and non-linear precoding operation, whereas the CPEs $30_2$ and $30_4$ are NLP non-capable CPEs supporting linear precoding operation only.

Figure 2A:
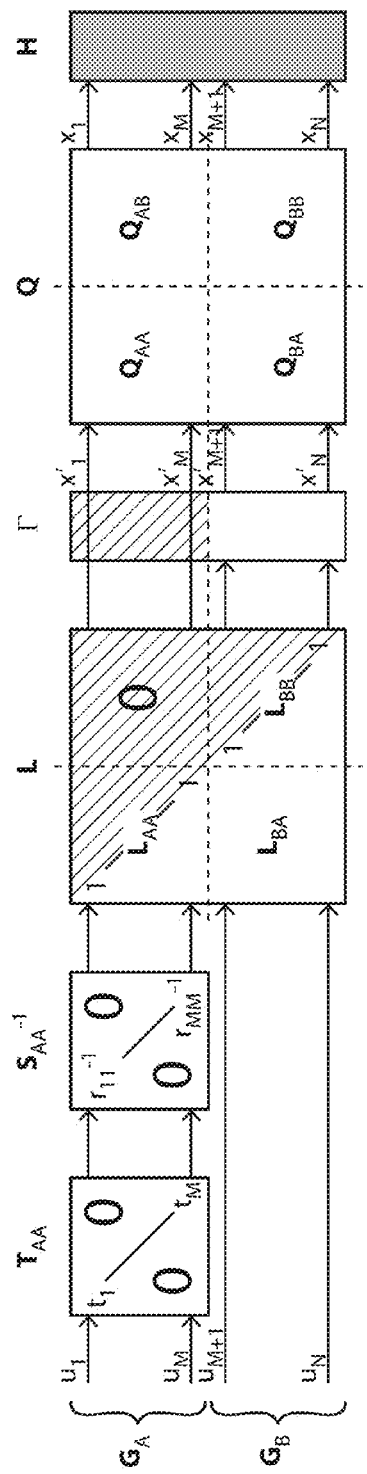
FIGS. 2A, 2B and 2C represent different precoding matrices that can be used in a non-linear precoder as per the present invention.

There is seen in FIG. 2A a functional illustration of the precoding and scaling matrices used in a non-linear precoder as per the present invention.

The mathematical notations that were introduced for the discussion of the prior art are still adhered to.

The subscriber lines are organized into a first group of subscriber lines $G_A$ comprising at least all NLP non-capable lines of the vectoring group, presently the subscriber lines $L_2$ and $L_4$ with regard to FIG. 1, and a second group of subscriber lines $G_B$ comprising the remaining NLP capable lines of the vectoring group, presently the subscriber lines $L_1$ and $L_3$ with regard to FIG. 1.

The first group $G_A$ may further comprise additional NLP capable lines for all carrier frequencies or for some specific carrier frequencies only. In the latter case, the group definition (and thus the precoding position) is frequency-dependent. This would be the case if NLP operation induces a net penalty compared LP operation on account of the increased modulation gap or on account of the increased average power, which is especially true for low-size constellation grids.

Let N denote the total number of subscriber lines in the vectoring group, and M the number of subscriber lines in the first group $G_A$. The number M may be frequency-dependent if the group definition is so.

The subscriber lines of the first group $G_A$ are precoded first and are assigned the precoding indexes from 1 to M. The subscriber lines of the second group $G_B$ are precoded last and are assigned the precoding indexes from M+1 to N.

Let the matrices subscripts AA, AB, BA and BB denote the matrix sub-block decompositions with respect to the index ranges [1;M] and [M+1;N], or equivalently with respect to the groups $G_A$ and $G_B$.

In a first step, gain scaling is applied to the transmit samples $u_1$ to $u_M$ in order to confine the respective transmit power levels at the input of the modulo unit within a transmit power mask, and further in order to bypass the modulo operation or to make the modulo operation ineffective (i.e., the output value of the modulo unit matches its input value).

The transmit samples $u_{M+1}$ to $U_N$ are not scaled and are processed through the non-linear precoder in sequential order.

As Q is unitary and thus preserves norms and powers, applying gain scaling on $P=QR^{*-1}$ corresponds with applying gain scaling on $R^{*-1}=L(\text{diag}(R^*))^{-1}$. As an example of gain scaling, one may apply Column Norm (CN) scaling, whereby each and every column of the matrix $R^{*-1}$ has substantially the same norm.

Owing to the line grouping, gain scaling is applied on the matrix $(R^{*-1})_{AA}=L_{AA}(\text{diag}(R^*_{AA}))^{-1}$ only, thereby increasing the gain values and thus the achievable data rates over the subscriber lines of the first group $G_A$. This results in a first diagonal scaling matrix $T_{AA}$ comprising $t_1$ to $t_M$ as respective scaling factors, and a second diagonal scaling matrix $S_{AA}^{-1}=(\text{diag}(R^*_{AA}))^{-1}$ before processing through the matrix L.

The matrix $T_{AA}$ is such that $(R^{*-1})_{AA}T_{AA}=L_{AA}(\text{diag}(R^*_{AA}))^{-1}T_{AA}$ has intermediate output power at or below the transmit power mask, or equivalently:

$$\|R^{*-1}_{AA}(i,*)t_i\|=\|L_{AA}(i,*)t_i/r_{ii}\|\leq TXPSD \text{ for } 1\leq i\leq M \quad (11),$$

wherein TXPSD denotes the applicable transmit power mask (omitting the frequency dependence k).

On account of this gain scaling and corresponding power confinement, the modulo function Γ can be bypassed or is made ineffective when the samples $u_1$ to $u_M$ are processed through the non-linear precoding stage L+Γ (see hashed area in the modulo function Γ in FIG. 2). These transmit samples can thus be linearly processed en bloc through the successive matrices $T_{AA}$, $S_{AA}^{-1}$ and $L_{AA}$, thereby yielding partially-processed transmit samples $x'_1$ to $X'_M$.

In a second step, the transmit samples $u_{M+1}$ to $u_N$ of the second group $G_B$ are kept unscaled and are processed in sequential order one after the other through the nonlinear precoding stage L+Γ as is typical for a non-linear precoder, thereby yielding partially-processed transmit samples $x'_{M+1}$ to $X'_N$. This second step can alternatively take place before the first step.

In a third and last step, all the partially-preprocessed transmit samples $x'_1$ to $x'_N$ are passed through the linear precoding stage Q for further transmission over the channel H.

Figure 2B:
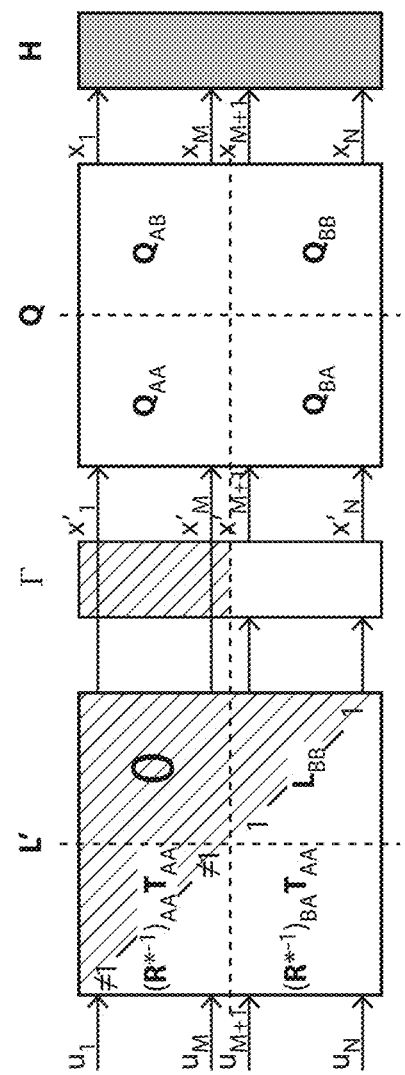
Figure 2C:
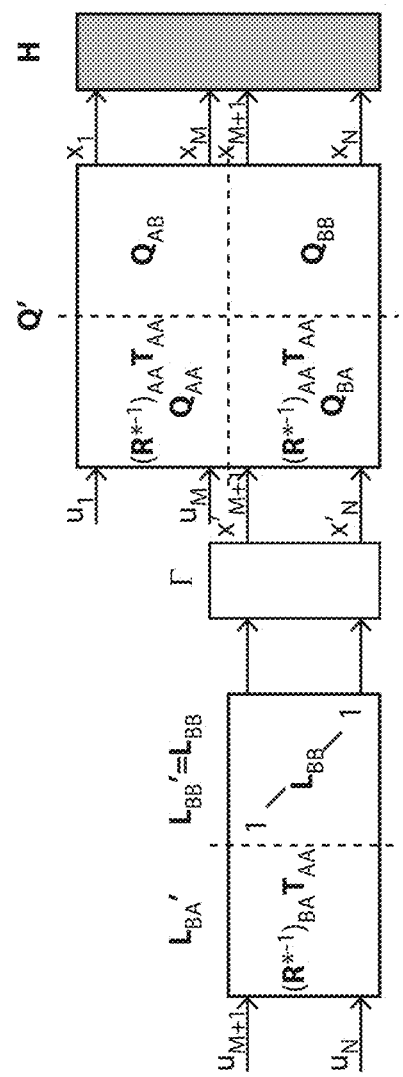

Two alternative embodiments are depicted in FIGS. 2B and 2C.

In the first alternative embodiment, the scaling matrices $T_{AA}$ and $S_{AA}^{-1}$ are merged with the matrix L, thereby yielding a new lower-triangular precoding matrix $L'=[(R^{*-1})_{AA}T_{AA} \; 0; (R^{*-1})_{BA}T_{AA} \; L_{BB}]$. It is noteworthy that the M first diagonal elements of the matrix L' are different from 1 on account of the gain scaling, while the N−M last diagonal elements of the matrix L' are approximately equal to 1 (in practice, they need to be slightly smaller than 1 due to the fact that the modulo operation adds a little power).

In the second alternative embodiment, the scaling matrices $T_{AA}$ and $S_{AA}^{-1}$ and the upper part of the triangular matrix L are all merged with the matrix Q, thereby yielding a new precoding matrix $Q'=[(R^{*-1})_{AA}T_{AA}Q_{AA} \; Q_{AB}; (R^{*-1})_{AA}T_{AA}Q_{BA} \; Q_{BB}]$, and the transmit samples $u_1$ to $u_M$ are directly input to the linear precoding stage Q'. In this implementation, the transmit samples $u_{M+1}$ to $U_N$ need to be processed first through the nonlinear precoding stage L'+Γ, thereby yielding the partially-processed samples $x'_{M+1}$ to $x'_N$, and next the transmit samples $u_1$ to $u_M$ together with the partially processed samples $x'_{M+1}$ to $x'_N$ are processed through the second linear precoding stage Q'.

This embodiment is particularly advantageous in that only two precoding steps are required, thereby saving substantial precoding resources.

Figure 3A:
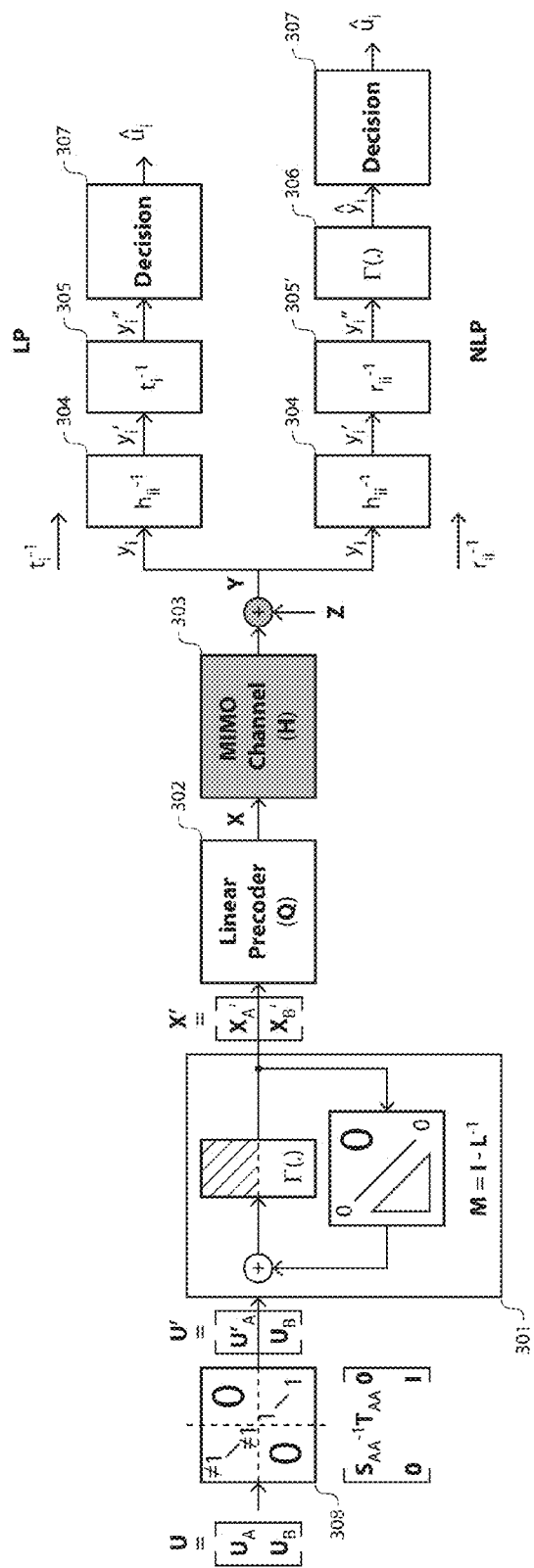
FIGS. 3A and 3B represent two different implementations of a non-linear precoder as per the present invention.

There is seen in FIG. 3A a first possible implementation for a non-linear precoder as per the present invention.

A transmit vector U, which comprises the transmit frequency samples $U_A$ of the first group $G_A$ as top vector coefficients and the transmit frequency samples $U_B$ of the second group $G_B$ as bottom vector coefficients, is first input to a scaling stage 308 for multiplication with the scaling matrix $[S_{AA}^{-1}T_{AA} \; 0; 0 \; I]$. The scaled transmit vector $U'=[U_A'; U_B]$, wherein $U_A'=S_{AA}^{-1}T_{AA}U_A$, is then fed to a first non-linear precoding stage 301.

The first non-linear precoding stage 301 uses the modulo function Γ, and a first lower-triangular precoding matrix M in the feedback loop. The matrix M is given by $M=I-L^{-1}=I-S^{-1}R^*$, and has zero coefficients along its diagonal. The first precoding stage 301 implements non-linear precoding as per equations (7) and (8), and outputs a partially-precoded vector $X'=[X_A'; X_B']$ to the second linear precoding stage 302.

The second linear precoding stage 302 uses a second unitary or almost-unitary matrix Q, and outputs a fully-precoded vector X for further transmission over the MIMO channel 303, which is represented by a channel matrix $H=DG=DR^*Q^*$.

The noisy received vector Y comprises the frequency samples received through the respective communication channels corrupted by some additive white Gaussian noise source Z. The respective coefficients of the vector Y are either processed by NLP non-capable CPEs or by NLP capable CPEs.

In case of LP operation (see the top processing branch termed LP in FIG. 3A), the receive sample $y_i$ goes through the equalization stages 304 and 305. The first equalization stage 304, which corresponds to the typical FEQ, uses the respective diagonal coefficients $h_{ii}^{-1}$ of the diagonal matrix $D^{-1}$ as determined during the training phase, and outputs a partially-equalized frequency sample $y_i'$. The second equalization stage 305 uses the respective diagonal coefficients $t_i^{-1}$ of the diagonal matrix $T_{AA}^{-1}$ as communicated by the remote DPU by means of Transmitter Initiated Gain Adaptation (TIGA) command (see $t_i^{-1}$ arrow in FIG. 3A), and outputs a fully-equalized frequency sample $y_i''$. The first and second equalization stages 304 and 305 can be merged into one single equalization stage. The properly equalized frequency sample $y_i''$ is then fed to a decision stage 307 (or demodulator) to yield an estimate $\hat{u}_i$ of the transmit sample $u_i$.

In case of NLP operation (see the bottom processing branch termed NLP in FIG. 3A), the receive sample $y_i$ goes through the equalization stage 304 and another equalization stage 305'. The equalization stage 305' uses the respective diagonal coefficients $r_{jj}^{-1}$ of the diagonal matrix $S_{BB}^{-1}$. Again the equalization stages 304 and 305' can be merged into one single equalization stage. The properly equalized frequency sample $y_i''$ goes through the modulo function Γ 306 to yield a possibly-modified frequency sample $\hat{y}_i$ for detection by the decision stage 307. The decision stage 307 outputs an estimate $\hat{u}_i$ of the transmit sample $u_i$.

An NLP capable CPE may follow the top processing branch for the carriers that have been precoded as forming part of the first group $G_A$, or may follow the bottom processing branch provided $t_i^{-1}$ substitutes for $r_{ii}^{-1}$ in the block 305' (then the modulo operation is expected to be transparent). The identity of those carriers can be obtained from the remote DPU, thereby allowing the CPE to apply specific modulation gaps and obtain more accurate bit loading values for those specific carriers.

Figure 3B:
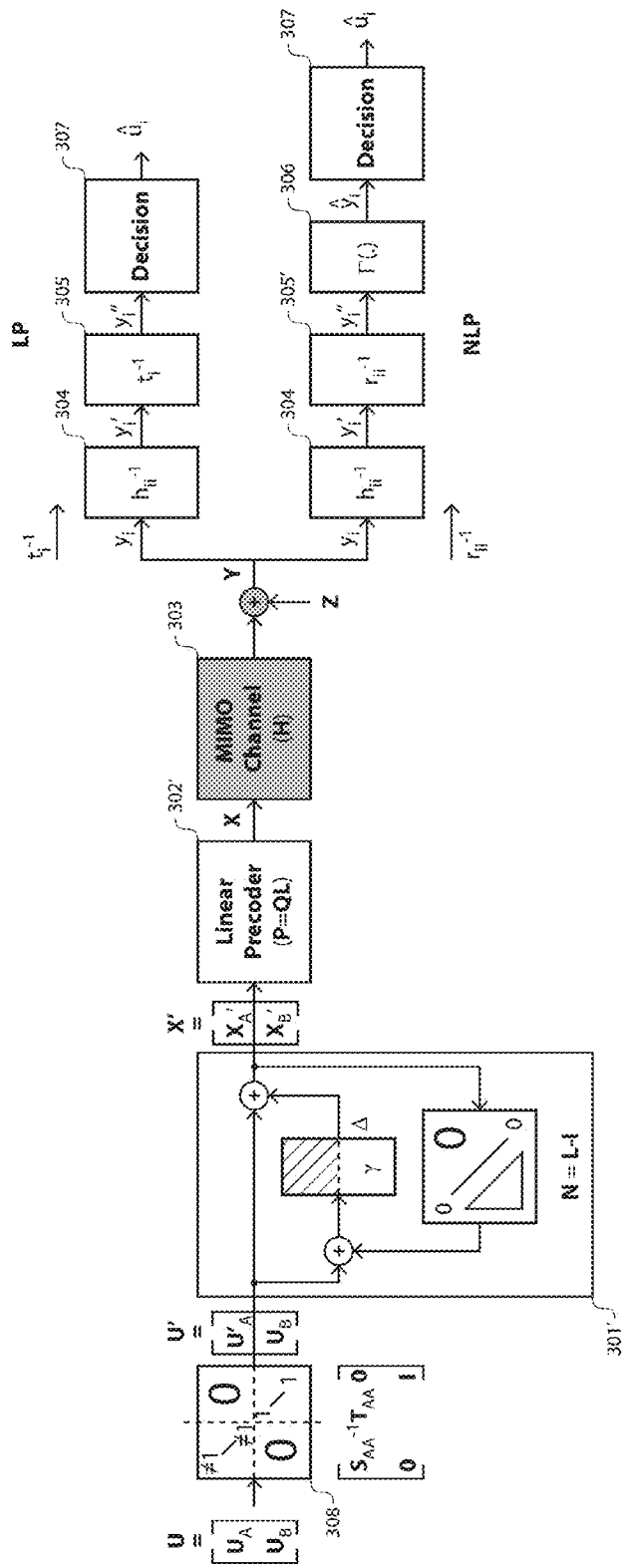

There is seen in FIG. 3B a second possible implementation for a non-linear precoder as per the present invention and in line with the technical teaching of the aforementioned patent application EP2800283.

In this implementation, two new precoding blocks 301' and 302' substitute for the former precoding blocks 301 and 302 respectively.

The precoding stage 301' is a modulo shift unit that adds a shift vector $\Delta$ to the scaled transmit vector U' without any further signal precoding. The shift vector $\Delta$ is designed to keep the fully-precoded signal within the allowed power bound. The first precoding stage 301' outputs the vector $X'=U'+\Delta$ to the second precoding stage 302'.

The precoding stage 301' includes a modified modulo function $\gamma$, and a matrix $N=L-I$ in the feedback loop. The modulo function is given by:

$$Y_{i,k}(x_{i,k}) = -d \cdot M_{i,k} \cdot \left\lfloor \frac{x_{i,k} + d \cdot M_{i,k}/2}{d \cdot M_{i,k}} \right\rfloor = \Gamma_{i,k}(x_{i,k}) - x_{i,k}, \quad (12)$$

and the shift vector $\Delta$ is given by:

$$\delta_i = Y_{i,k}\left(u'_i + \sum_{j=1}^{i-1} l_{ij} \cdot (u'_j + \delta_j)\right),$$

wherein $u_i'$, $\delta_i$ and $l_{ij}$ denote the coefficients of U', $\Delta$ and $L=R^{*-1}S$ respectively.

The second precoding stage 302' makes use of the full ZF precoding matrix $P=QL$, and outputs a fully precoded signal $X=PX'$ for further transmission over the MIMO channel 303.

The implementations depicted in FIGS. 3A and 3B fully leverage on the NLP architecture without the need for additional hardware or software logic for processing the transmit frequency samples $U_A$ of the first group $G_A$ (except the upfront scaling). Yet the transmit frequency samples $U_A$ can alternatively be processed through a separate branch including one or more feedforward filters without any modulo unit, for instance by using the successive feedforward filters $T_{AA}S_{AA}^{-1}$, L and Q as per FIG. 2A, or L' and Q as per FIG. 2B, or simply Q' as per FIG. 2C. The transmit frequency samples $U_B$ of the second group $G_B$ keep on being processed as usual through the feedback filter M or N and the modulo unit $\Gamma$ or $\gamma$.

With the proposed precoding scheme, both the LP and NLP lines have a performance exceeding that of a pure LP system. The performance of the LP lines is better than their performance when all lines would be LP as only a subset of the lines need to be scaled down. Because of being encoded last, NLP lines don't get ideal NLP gain but performance is still better than LP (ignoring power penalties inherent to NLP on account of the modulation gap increase or of the power increase due to uniform distribution of the constellation points) as their transmit power budget is larger than the average power budget in gain-scaled LP.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital signal Processor (DSP) hardware, network processor, Application specific Integrated circuit (ASIC), Field Programmable Gate Array (FPGA), etc. Other hardware, conventional and/or custom, such as Read Only Memory (ROM), Random Access Memory (RAM), and non volatile storage, may also be included.

The invention claimed is:

1. A method for jointly processing signals to be transmitted over respective ones of a plurality of subscriber lines through a non-linear precoder comprising a first non-linear precoding stage configured to operate according to a first triangular precoding matrix and including a modulo unit, followed by a second linear precoding stage configured to operate according to a second precoding matrix,
wherein the method comprises organizing the plurality of subscriber lines into a first group of subscriber lines and a second group of subscriber lines, the first group of subscriber lines at least comprising the subscriber lines of the plurality of subscriber lines that do not support non-linear precoding operation, and the second group of subscriber lines comprising the remaining subscriber lines of the plurality of subscriber lines, scaling first signals to be transmitted over respective ones of the first group of subscriber lines to confine respective intermediate transmit power levels at the input of the modulo unit and further to bypass or make ineffective the operation of the modulo unit, and processing the so scaled first signals and second signals to be transmitted over respective ones of the second group of subscriber lines through the first and second precoding stages.

2. A method according to claim 1, wherein the first group of subscriber lines is assigned the first precoding positions in the first and second precoding matrices while the second group of subscriber lines is assigned the last precoding positions in the first and second precoding matrices.

3. A method according to claim 1, wherein the intermediate power levels are confined within a transmit power mask applicable to transmission of signals over the plurality of subscriber lines.

4. A method according to claim 1, wherein the first group of subscriber lines further comprises a subscriber line of the plurality of subscriber lines that supports non-linear precoding operation.

5. A method according to claim 4, wherein the addition of the subscriber line to the first group of subscriber lines is restricted to given carriers for which non-linear precoding induces a net penalty compared to linear precoding.

6. A method according to claim 5, wherein the method further comprises sending information indicative of the identity of the given carriers to a remote transceiver coupled to the subscriber line.

7. A method according to claim 1, wherein the scaling of the first signals is applied upfront before the first precoding stage.

8. A method according to claim 1, wherein the scaling of the first signals and the processing of the first signals through the first precoding stage are performed by means of a single matrix multiplication stage.

9. A method according to claim 1, wherein the scaling of the first signals and the processing of the first signals through the first and second precoding stages are performed by means of a single matrix multiplication stage.

10. A method according to claim 1, wherein the first signals are processed en bloc through the non-linear precoder.

11. A method according to claim 1, wherein the second precoding matrix is a unitary matrix.

12. A method according to claim 1, wherein the second precoding matrix is a full precoding matrix.

13. A non-linear precoder for jointly processing signals to be transmitted over respective ones of a plurality of subscriber lines, and comprising a first non-linear precoding stage configured to operate according to a first triangular precoding matrix and including a modulo unit, followed by a second linear precoding stage configured to operate according to a second precoding matrix, wherein the plurality of subscriber lines is organized into a first group of subscriber lines and a second group of subscriber lines, the first group of subscriber lines at least comprising the subscriber lines of the plurality of subscriber lines that do not support non-linear precoding operation, and the second group of subscriber lines comprising the remaining subscriber lines of the plurality of subscriber lines, wherein the non-linear precoder is further configured to scale first signals to be transmitted over respective ones of the first group of subscriber lines to confine respective first intermediate transmit power levels at the input of the modulo unit and further to bypass or make ineffective the operation of the modulo unit, and to process the so scaled first signals and second signals to be transmitted over respective ones of the second group of subscriber lines through the first and second precoding stages.

14. An access node comprising a non-linear precoder according to claim 13.

15. An access node according to claim 14, wherein the access node is a Distribution Point Unit DPU.

* * * * *